(12) United States Patent
Cazier et al.

(10) Patent No.: US 8,712,208 B2
(45) Date of Patent: Apr. 29, 2014

(54) STORING A LOCATION WITHIN METADATA OF VISUAL MEDIA

(75) Inventors: Robert P Cazier, Fort Collins, CO (US); Shane D Voss, Fort Collins, CO (US); Jason Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 13/115,106

(22) Filed: May 24, 2011

(65) Prior Publication Data

US 2012/0301103 A1  Nov. 29, 2012

(51) Int. Cl.
*H04N 5/77* (2006.01)

(52) U.S. Cl.
USPC ...................................... 386/227

(58) Field of Classification Search
USPC ................ 386/227, 224, 342, 242; 348/231.3
See application file for complete search history.

(56) References Cited

U.S. PATENT DOCUMENTS

| | | | |
|---|---|---|---|
| 6,507,371 B1 * | 1/2003 | Hashimoto et al. | 348/552 |
| 6,819,707 B2 | 11/2004 | Abraham et al. | |
| 7,333,054 B2 * | 2/2008 | Ueno et al. | 342/357.74 |
| 7,561,101 B1 * | 7/2009 | Tester et al. | 342/357.77 |
| 7,742,099 B2 * | 6/2010 | Ueno et al. | 348/372 |
| 8,238,615 B2 * | 8/2012 | Cerosaletti et al. | 382/112 |
| 8,285,484 B1 * | 10/2012 | Lau et al. | 701/468 |
| 8,473,195 B2 * | 6/2013 | Sambongi | 701/411 |
| 2001/0017668 A1 * | 8/2001 | Wilcock et al. | 348/552 |
| 2005/0275726 A1 * | 12/2005 | Abraham et al. | 348/207.99 |
| 2008/0226130 A1 * | 9/2008 | Kansal et al. | 382/106 |
| 2009/0094518 A1 * | 4/2009 | Lawther et al. | 715/716 |
| 2009/0279842 A1 * | 11/2009 | Liao et al. | 386/69 |
| 2010/0004997 A1 * | 1/2010 | Mehta et al. | 705/14.66 |
| 2010/0048199 A1 | 2/2010 | Forslow | |
| 2010/0231383 A1 * | 9/2010 | Levine et al. | 340/540 |
| 2010/0318289 A1 * | 12/2010 | Sambongi | 701/201 |
| 2011/0256881 A1 * | 10/2011 | Huang et al. | 455/456.1 |

FOREIGN PATENT DOCUMENTS

JP          10-056609          *  2/1998

* cited by examiner

*Primary Examiner* — David Harvey

(74) *Attorney, Agent, or Firm* — Chun-Liang Kuo

(57) ABSTRACT

A device to detect location data, store a first location of the device within metadata of visual media if the location data is available, and store a second location within the metadata of the visual media if the location data is unavailable.

20 Claims, 7 Drawing Sheets

STORING A LOCATION WITHIN METADATA OF VISUAL MEDIA

BACKGROUND

A user can initially capture an image using an image capture device. The user can then access the captured image using one or more input buttons to manually add information to the image. Additionally, the user can access the captured image from another device and proceed to add the information to the image. The information entered by the user can include who is included in the image, where the image was taken, and/or notes of the image.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

When managing visual media captured by a device, the device can poll a location tracking component for location data in response to an image capture component capturing the visual media. Using the location data, the device can identify a current coordinate and/or a current location of the device. Additionally, using the current coordinate of the location data, the device can identify a first location of the device corresponding to the current location of the device and store the first location of the device to metadata of the visual image. As a result, the device can accurately identify and record within the metadata where the visual image was captured.

If the location data and the current coordinate are unavailable, the device can access a second location of the device corresponding to a last known location and/or last known coordinate of the device. The device can then store the second location to the metadata of the visual media. By storing the second location within the metadata of the visual media, even if a current coordinate of the device is available through location data, the device can continue to identify and record a most likely location of where the visual image is captured.

Figure 1:
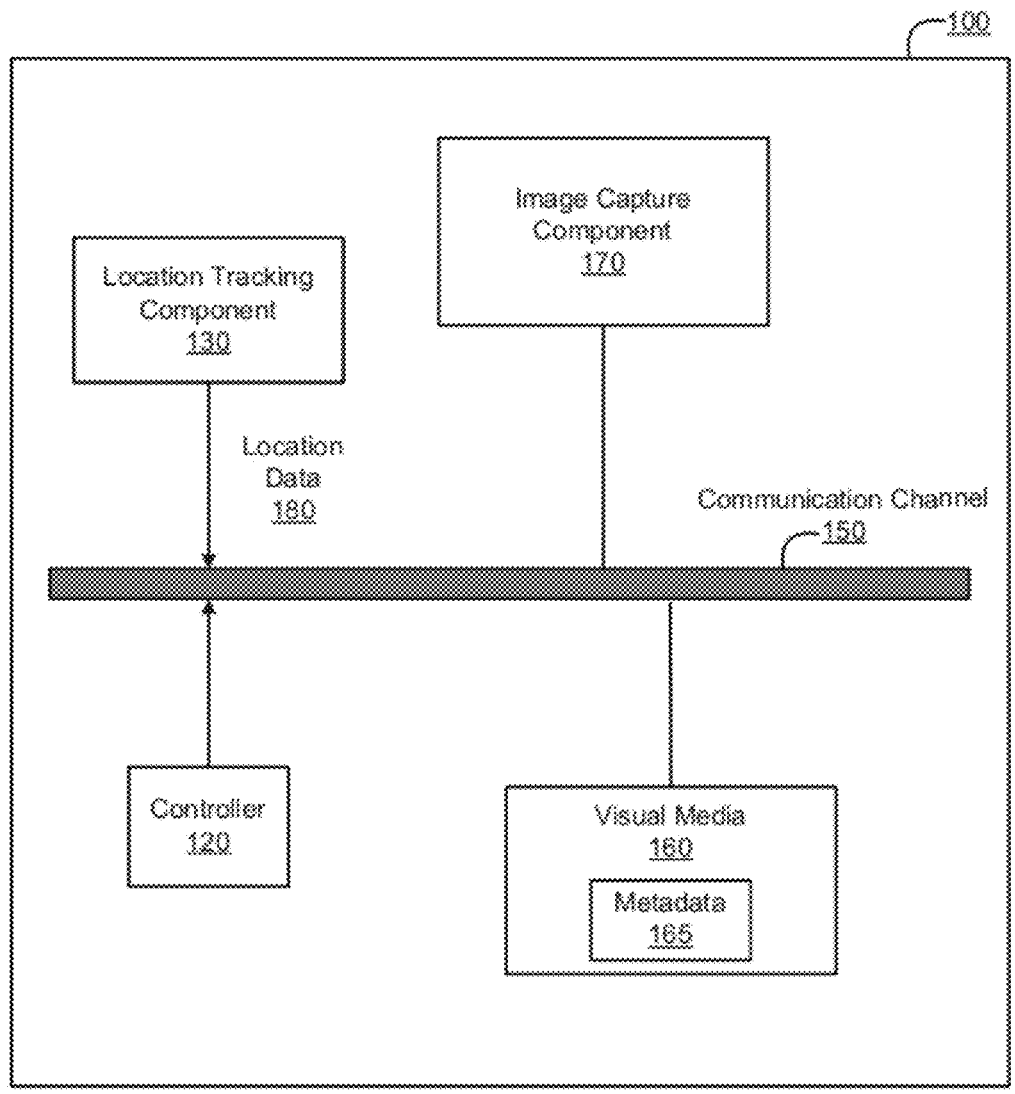
FIG. 1 illustrates a device with an image capture component and a location tracking component according to an embodiment.

FIG. 1 illustrates a device with an image capture component 170 and a location tracking component 130 according to an embodiment. In one embodiment, the device 100 can be a cellular device, a FDA (Personal Digital Assistant), an E (Electronic)—Reader, a tablet, a camera and/or the like. In another embodiment, the device 100 can be a desktop, a laptop, a notebook, a tablet, a netbook, an all-in-one system, a server, and/or any additional device which can include an image capture component 170 and a location tracking component 130.

As illustrated in FIG. 1, the device 100 includes a controller 120, a an image capture component 170, a location tracking component 130, and a communication channel 150 for the device 100 and/or one or more components of the device 100 to communicate with one another. In one embodiment, the device 100 includes a media application stored on a computer readable medium included in or accessible to the device 100. In other embodiments, the device 100 includes additional components and/or is coupled to additional components in addition to and/or in lieu of those noted above and illustrated in FIG. 1.

As noted above, the device 100 can include a controller 120. The controller 120 can send data and/or instructions to the components of the device 100, such as the image capture component 170, the location tracking component 130, and/or the media application. Additionally, the controller 120 can receive data and/or instructions from components of the device 100, such as the image capture component 170, the location tracking component 130, and/or the media application.

The media application is an application which can be utilized in conjunction with the controller 120 to manage visual media 160. For the purposes of this application, the visual media 160 can include one or more images and/or videos captured by an image capture component 170 of the device 100. The image capture component 170 is a hardware component of the device 100 configured to capture visual media 160 as a two-dimensional and a three-dimensional image or video.

In response to the image capture component 170 capturing the visual media 160, the controller 120 and/or the media application can poll a location tracking component 130 of the device 100 for location data 180. For the purpose of this application, the location tracking component 130 is a hardware component of the device 100 configured to identify location data 180 corresponding to a location of the device 100 and provide the location data 180 to the controller 120 and/or the media application. In one embodiment, the location tracking component 130 can be a GPS (global positioning system) receiver and/or a radio device configured to detect one or more signals from satellites, base stations, and/or cellular towers to identify a location of the device 100.

One or more of the signals can include communication signals, ranging signals, and/or navigation messages which are utilized by the location tracking component 130 to identify a coordinate of the device 100. The location tracking component 130 can include the coordinate of the device 100 as the location data 180. If the coordinate of the device 100 is identified, the location tracking component 130 can notify the controller 120 and/or the media application that the location data 180 is available. If the coordinate of the device 100 is not identified, the location tracking component 130 can notify the controller 120 and/or the media application that the location data 180 is not available.

If the location data 180 is available, the location tracking component 130 can provide the location data 180 to the controller 120 and/or the media application. In response to receiving location data 180, the controller 120 and/or the media application can identify a first location of the device 100 and store the first location within metadata 165 of the visual media 160. For the purposes of this application, the first location corresponds to a current location of the device 100 and is based on the location data 180 from the location tracking component 130. The metadata 165 can include data and/or information associated with the visual media 160. The metadata 165 can be included as part of the visual media 160 or as a separate file associated with the visual media 160.

If the location data 180 is not available, the location tracking component 130 can notify the controller 120 and/or the media application that the location data is unavailable. The controller 120 and/or the media application can then proceed to access a second location and store the second location within the metadata 165 of the visual media 160. For the purposes of this application, a second location is a last known location of the device 100. In one embodiment, the second location is based on the recently identified and/or a previously identified coordinate from the location tracking component 130 before the signal was not detected. Using the second location, the controller 120 and/or the media application can identify a last known location of the device 100.

The media application can be firmware which is embedded onto the controller 120, the device 100, and/or a storage device coupled to the device 100. In another embodiment, the media application is an application stored on the device 100 within ROM (read only memory) or on the storage device accessible by the device 100. In other embodiments, the state application is stored on a computer readable medium readable and accessible by the device 100 or the storage device from a different location. The computer readable medium can include a transitory or a non-transitory memory.

Figure 2A:
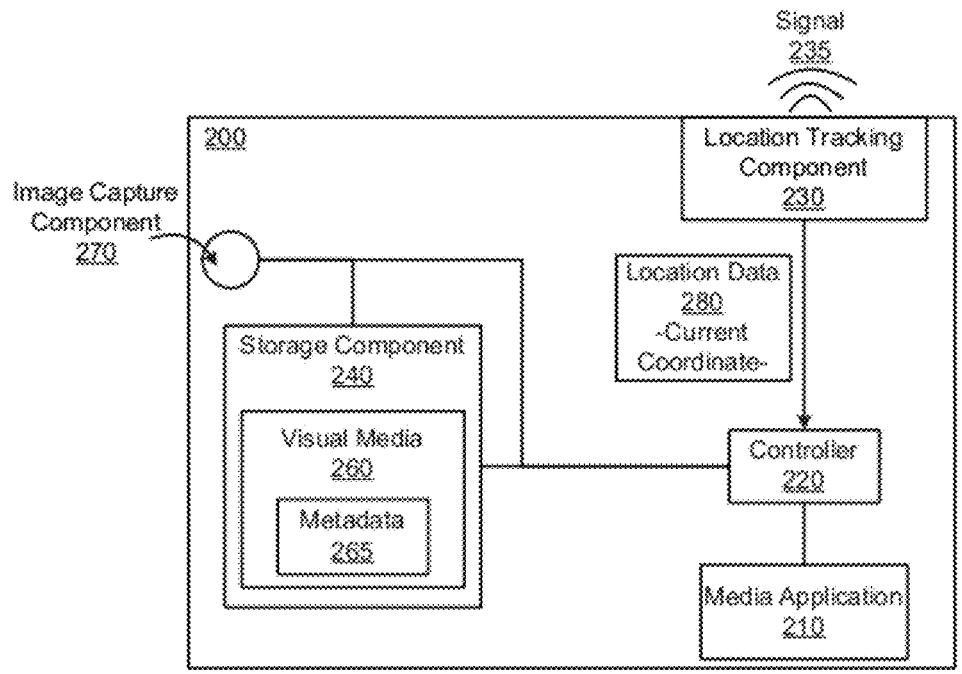
FIG. 2A illustrates a location tracking component providing location data according to an embodiment.

FIG. 2A illustrates a location tracking component 230 providing location data 280 according to an embodiment. As noted above, the location tracking component 230 can be polled for the location data 280 in response to an image capture component 270 capturing visual media 260. The image capture component 270 is a hardware component of the device 200 configured by a user, the controller 220, and/or the media application 210 to capture visual media 260 as one or more images and/or videos. In one embodiment, the image capture component 270 can be a camera, scanner and/or photo sensor.

The visual media 260 can be stored by the image capture component 270, the controller 220, and/or the media application 210 as an image file, a video file, a media file, and/or any additional file on a storage component 240 accessible to the device 200. Additionally, the visual media 260 can include metadata 265. The metadata 265 can include data and/or information which can be populated by the controller 220 and/or the media application 210 with a location corresponding to where the visual media 260 was captured.

The metadata 265 can be included as part of the visual media 260. In another embodiment, the metadata 265 can be another file associated with the visual media 260 and stored on a storage component 240 accessible to the device 200. The storage component 240 can be a hard drive, a compact disc, a digital versatile disc, a Blu-ray disk, a flash drive, a network attached storage device, and/or any additional non-transitory computer readable memory accessible to the controller 220 and/or the media application 210.

As noted above, in response to the image capture component 270 capturing any visual media 260, the controller 220 and/or the media application 210 can poll the location tracking component 230 for location data 280. As noted above and illustrated in FIG. 2A, the location tracking component 230 is a hardware component of the device 200 configured to detect one or more signals 235 from satellites, base stations, and/or communication towers. One or more of the signals 235 can include communication signals, ranging signals, and/or navigation messages.

When identifying the location data 280, the location tracking component 230 can attempt to identify a current coordinate of the device 200. In one embodiment, the location tracking component 230 can identify a current coordinate if the location tracking component 230 is coupled to at least three communication devices, such as satellites, communication towers, and/or base stations. When coupled to at least three communication devices, the location tracking component 230 can receive signals 235 from the communication devices and use the signals 235 to identify a current coordinate of the location tracking component 230.

In one embodiment, the location tracking component receiver 230 identifies the current coordinate by triangulating the position of the location tracking component 230 using the signals 235. The current coordinate can include one or more numbers which correspond to a current location of the device 200. In other embodiments, other methods and/or process cases be used to identify the current coordinate or current location of the device 200. Once the current coordinate has been identified, the location tracking component 230 can supply the current coordinate to the controller 220 and/or the media application 210 as the location data 280.

The location tracking component 230 can be polled by the controller 220 and/or the media application 210 for the location data 280 in response to an image capture component 270 of the device capturing visual media 260. In another embodiment, the location tracking component 230 can be polled by he controller 220 and/or the media application 210 for the location data 280 in response to the device 200 powering on. The device 200 can be powered on if the controller 220 and/or one or more components of the device 200 receive power from one or more power sources.

Figure 2B:
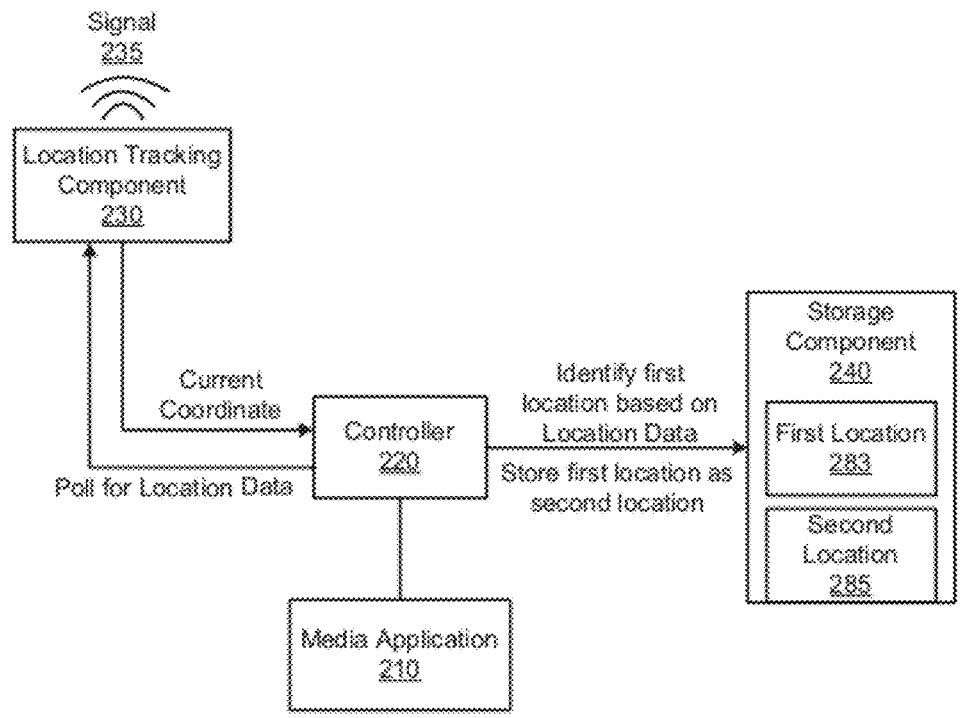
FIG. 2B illustrates a block diagram of a first location and a second location being identified according an embodiment.

FIG. 2B illustrates a block diagram of a first location 283 and a second location 285 being identified according an embodiment. As shown in the present embodiment, in response the location tracking component 230 identifying a current coordinate, the current coordinate can be supplied to the controller 220 and/or the media application 210 as location data. In response to receiving the location data, the controller 220 and/or the media application 210 can store the location data as a first location 283 of the device 200. As noted above, the first location 283 corresponds to a current location of the device 200.

In one embodiment, the current coordinate of the location data can be stored as the first location 283 within a storage component 240 of the device 200. In another embodiment, the first location 283 can be stored within a cache of the location tracking component 230 and/or on any additional storage device accessible to the controller 220 and/or the media application 210. In other embodiments, the controller 220 and/or the media application 210 can additionally identify an address, city, and/or name of a location associated with the current coordinate. The address, city, and/or name of the location can then be stored onto the storage component 240 and/or the location tracking component 230 as the first location 283.

Additionally, as illustrated in FIG. 2B, the controller 220 and/or the media application 210 can store a copy of the first location 283 as a second location 285. As noted above, the second location 285 corresponds to a last known location of the device and includes the most recent coordinate detected by the location tracking component 230. As a result, the second location 285 can be a backup coordinate or location.

In one embodiment, the controller 220 and/or the media application 210 can additionally include a time stamp with the second location 285 to identify when it was created. By storing a copy of the first location 283 as the second location 285, the first location 283 can continue to be updated with updated location data while the last known coordinate is maintained as a backup even if the location tracking component 230 loses signal.

Once the second location 285 has been stored, the controller 220 and/or the media application 210 can continue to poll the location tracking component 230 for an updated location data at predefined intervals. In one embodiment, each time the location tracking component 230 detects a new or updated coordinate, the controller 220 and/or the media application 210 can overwrite the first location 283 with the new or updated coordinate.

By detecting the position or location of the device 200 changing over time, controller 220 and/or the media application 210 can detect a speed and/or velocity which the device 200 is repositioning. The controller 220 and/or the media application 210 can additionally modify a rate of polling the location tracking component 230 for the location data based on the detected velocity of the device 200 repositioning. In one embodiment, the controller 220 and/or the media application 210 can increase a rate of polling the location tracking component 230 for the location data if the velocity of the device 200 repositioning is increases. In another embodiment, the controller 220 and/or the media application 210 can decrease a rate of polling the location tracking component 230 for the location data if the velocity of the device 200 repositioning decreases.

Figure 3:
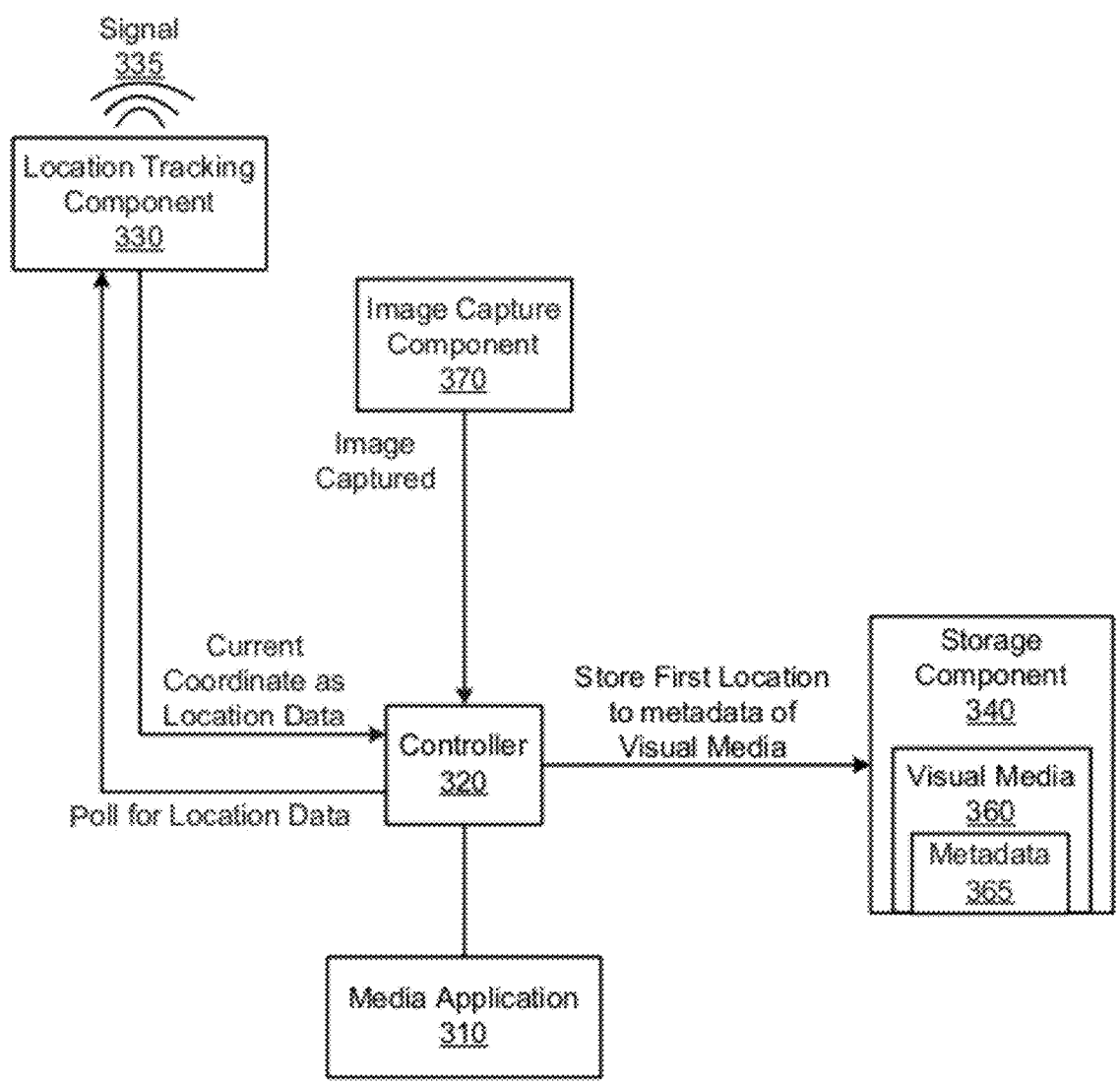
FIG. 3 illustrates a block diagram of a first location being stored within metadata of visual media according to an embodiment.

FIG. 3 illustrates a block diagram of a first location being stored within metadata 365 of visual media 360 according to an embodiment. As shown in the present embodiment, the image capture component 370 has captured visual media 360. In response, the captured visual media 360 is stored within a storage component 340 of the device. The controller 320 and/or the media application 310 then proceed to poll a location tracking component 330 for location data.

As noted above, the location tracking component 330 detects for one or more signals 335 from communication devices, such as satellites, base stations, and/or communication towers to identify a current coordinate of the device. In one embodiment, the location tracking component 330 can identify an amount of satellites which the location tracking component 330 is receiving signals 335 from. If the location tracking component 330 receives signals from at least three communication devices, the location tracking component 330 will be coupled to at least three communication devises and the location tracking component 330 can use the signals to triangulate the current coordinate of the device. In other embodiments, other algorithms and/or methods can be used by the location tracking component 330 to identify the current coordinate.

In response to identifying the current coordinate, the location tracking component 330 can provide the controller 320 and/or the media application 310 the current coordinate as location data. In one embodiment, the current coordinate can include one or more numbers which correspond to a location of the device. In response to receiving the location data, the controller 320 and/or the media application 310 can store the current coordinate within metadata 365 of the captured visual media 360 as a first location. In another embodiment, controller 320 and/or the media application 310 store an address, city, and/or name of a place or location associated with the current coordinate within the metadata 365 as the first location.

Figure 4A:
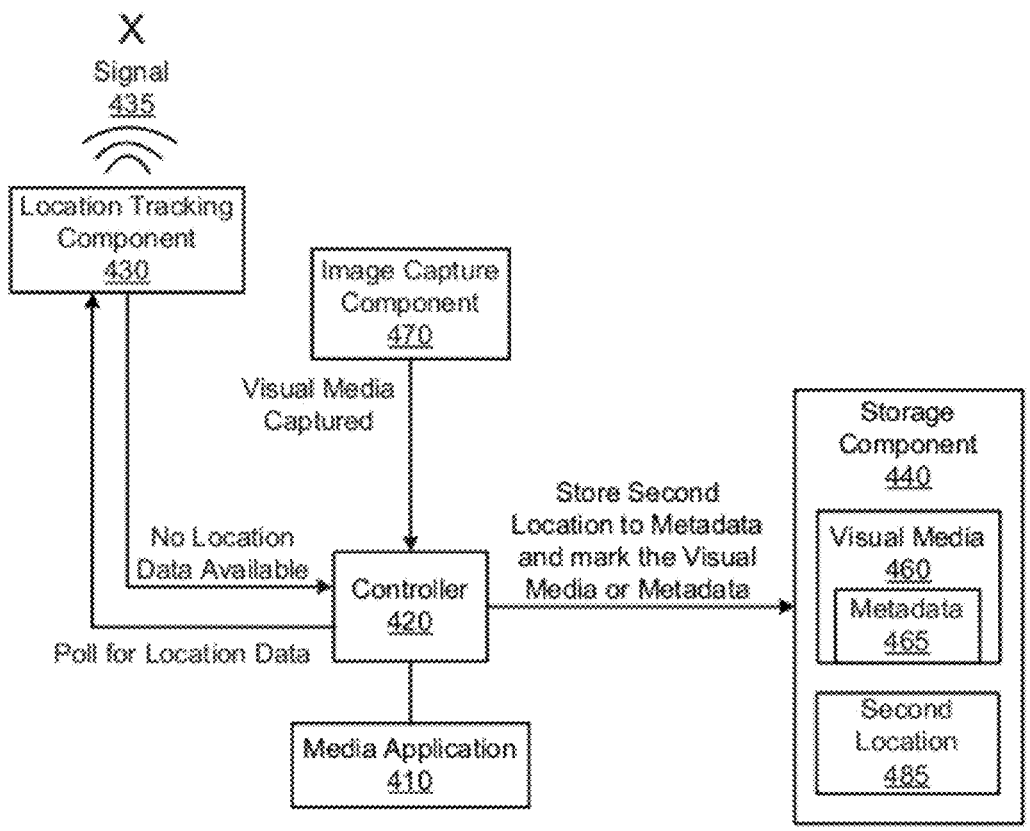
FIG. 4A illustrates a block diagram of a second location being stored within metadata of visual media according to an embodiment.

FIG. 4A illustrates a block diagram of a second location 485 being stored within metadata 465 of visual media 460 according to an embodiment. As noted above, the second location 485 is stored to the metadata 465 if location data from the location tracking component 430 is unavailable. As shown in the present embodiment, the image capture component 470 has captured visual media 460 and the controller 420 and/or the media application 410 poll the location tracking component 430 for the location data.

As shown in FIG. 4A, the location tracking component 430 does not detect one or more signals 435. As a result, a current coordinate of the device is unavailable. In response, the location tracking component 430 notifies the controller 420 and/or the media application 410 that location data is unavailable. In response, the controller 420 and/or the media application 410 proceed to access a second location 485 previously stored on the storage component 440 and/or on a cache of the location tracking component 430.

As noted above, the second location 485 is a copy of the first location previously created from a last known location or coordinate of the device. The controller 420 and/or the media application 410 store the second location 485 within metadata 465 of the captured visual media 460. By storing the second location 485 within the metadata 465 of the visual media 460, the controller 420 and/or the media application 410 can use a last known coordinate or location to represent a location of where the current visual media 460 is captured. In one embodiment, the controller 420 and/or the media application 410 can add a time stamp to the metadata 465 to identify when the visual media 460 was captured.

Additionally, the controller 420 and/or the media application 410 can further mark the metadata 465 and/or the visual media 460 to identify that a second location 485 was used to identify where the visual media 460 was taken. The controller 420 and/or the media application 410 can mark the metadata 465 and/or the visual media 460 by flagging the metadata 465 and/or the visual media 460. In another embodiment, a header of the metadata 465 and/or the visual media 460 can be edited by the controller 420 and/or the media application 410 when marked.

Figure 4B:
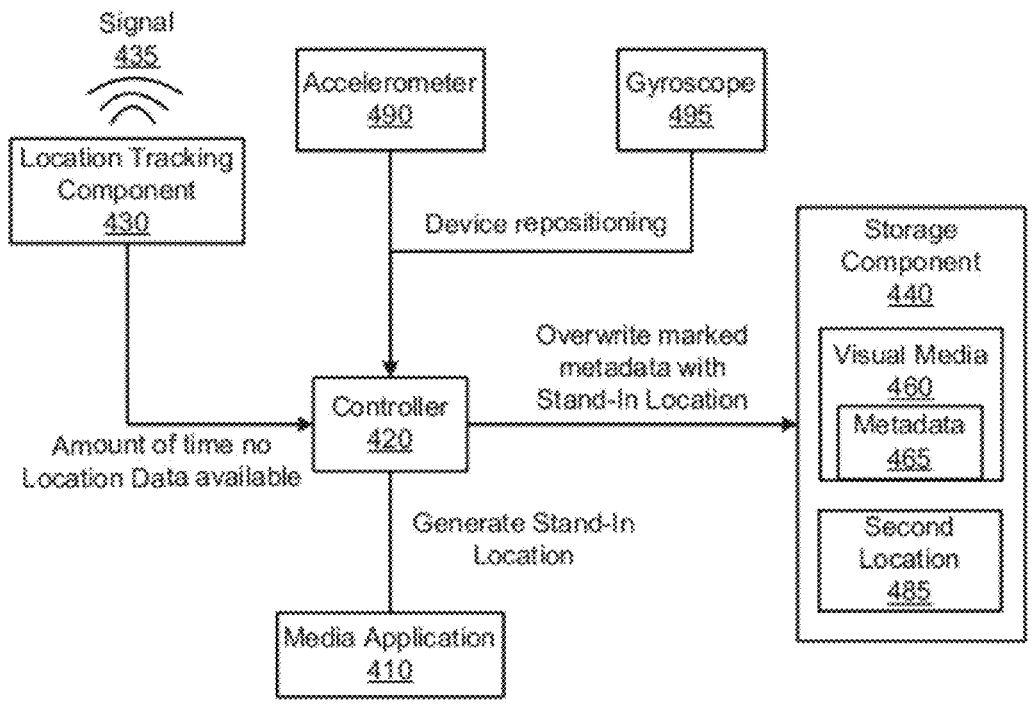
FIG. 4B illustrates a block diagram of metadata of visual media being updated according to an embodiment.

FIG. 4B illustrates a block diagram of metadata 465 of visual media 460 being updated according to an embodiment. In one embodiment, while no location data is available from the location tracking component 430, the controller 420 and/or the media application 410 can determine whether the device is repositioning. As shown the present embodiment, the controller 420 and/or the media application 410 can access one or more sensors to determine whether the device is moving or repositioning.

As shown in FIG. 4B, one or more sensors can include an accelerometer 490 configured to detect a direction of the device repositioning. Additionally, one or more sensors can include a gyroscope 495 to detect an orientation of the device repositioning. In other embodiments, one or more sensors can include a magnetometer and/or any additional device which can detect the device repositioning.

If the device is not detected to be repositioning, the controller 420 and/or the media application 410 can determine that the second location is accurate 485 and the second location 485 can continue to be used as a location where visual media 460 is captured. Additionally, the controller 420 and/or the media application 410 can remove any mark which were made to images 460 or metadata 465 if the image 460 was taken while the device is stationary.

In another embodiment, if the device is detected to be repositioning, the controller 420 and/or the media application 410 can proceed to generate a stand-in location. The stand-in location is a coordinate, address, city, and/or name of a location corresponding to the coordinate where corresponding to a most likely location where the device is when the visual media 460 is captured.

When generating the stand-in location, the controller 420 and/or the media application 410 can initially identify an amount of time which no current coordinate is identified by the location tracking component 430. As noted above, the last known coordinate 485 can be time stamped as to when it was originally created or updated. The controller 420 and/or the media application 410 can compare the time stamp to a current time to identify the amount of time which no current coordinate is available. In another embodiment, if a signal is redetected or reestablished by the location tracking component 430, the amount of time which no location data is available can be based on the time stamp of the last known coordinate a the current time when a current coordinate is identified.

Using the second location 485, a time which the visual media 460 was captured, the amount of time which no location data is available, a direction of the device repositioning, and/or an orientation of the device repositioning, the controller 420 and/or the media application 410 can generate a stand-in coordinate. The controller 420 and/or the media application 410 can use one or more interpolation methods and/or algorithms to generate the stand-in coordinate. In other embodiments, additional methods and/or algorithms can be utilized to generate a stand-in location.

The controller 420 and/or the media application 410 can then proceed to identify a number of marked metadata 465 corresponding to the visual media 460 which was captured when no location data was available and if the device was repositioning. Additionally, the controller 420 and/or the media application 410 can identify when each of the visual media 460 were captured. The controller 420 and/or the media application 410 can then generate stand-in locations for each visual media 460 which was captured while no location data was available.

The controller 420 and/or the media application 410 can then proceed to access the metadata 465 for each of the visual media 460 and overwrite the second location 485 stored within the metadata 465 with the corresponding stand-in location for the visual media 460. In another embodiment, a user can additionally utilize an input component of the device to edit and/or overwrite one or more of the locations stored within the metadata 465 of the visual media 460. The input component can include a touch panel, a touch screen, one or more buttons, one or more alphanumeric keys, and/or any additional input component accessible to a user of the device.

Figure 5:
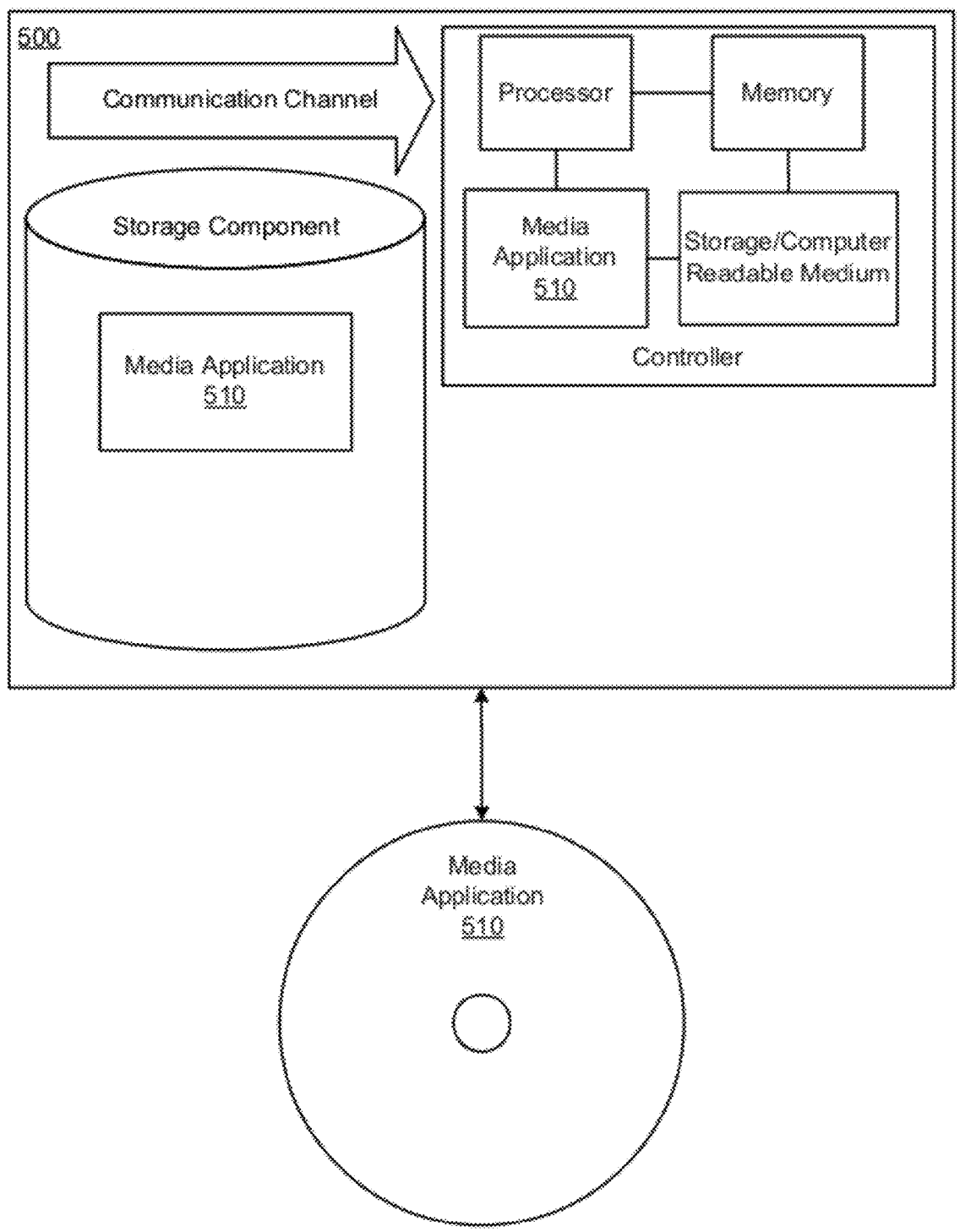
FIG. 5 illustrates a media application on a device and the media application stored on a removable medium being accessed by the device according to an embodiment.

FIG. 5 illustrates a media application 510 on a device 500 and the media application 510 stored on a removable medium being accessed by the device 500 according to an embodiment. For the purposes of this description, a removable medium is any tangible apparatus that contains, stores, communicates, or transports the application for use by or in connection with the device 500. As noted above, in one embodiment, the media application 510 is firmware that is embedded into one or more components of the device 500 as ROM. In other embodiments, the media application 510 is an application which is stored and accessed from a hard drive, a compact disc, a flash disk, a network drive or any other form of computer readable medium that is coupled to the device 500.

Figure 6:
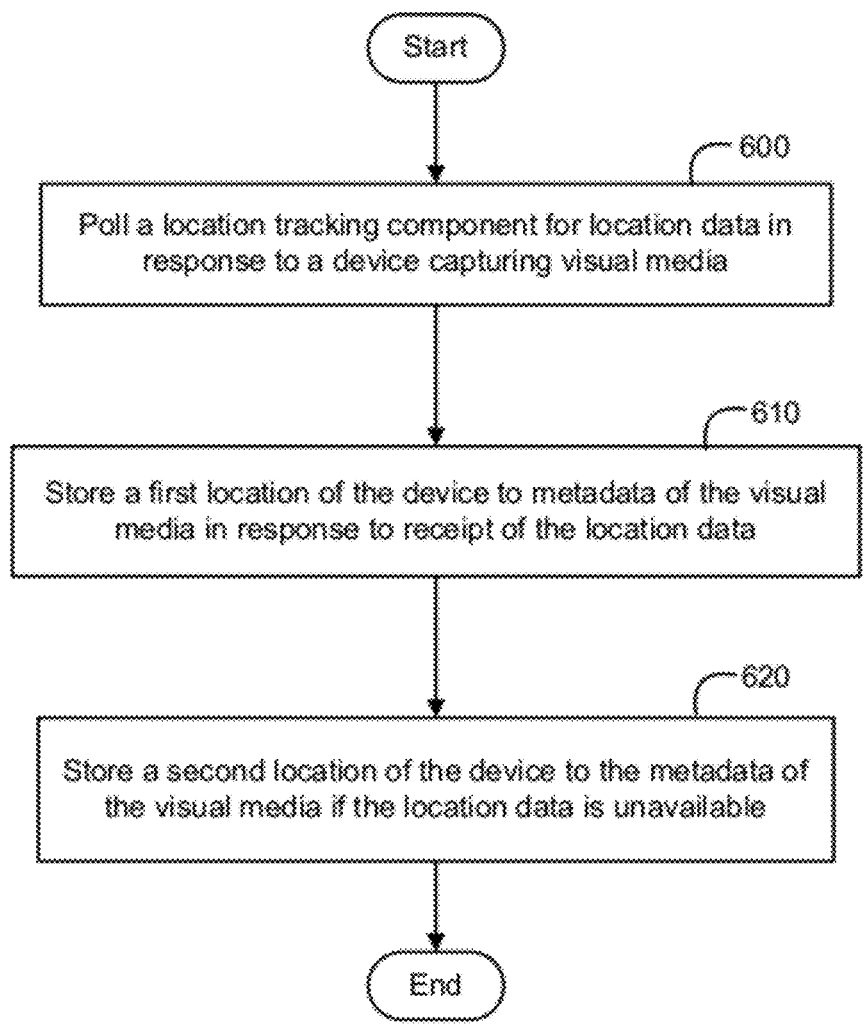
FIG. 6 is a flow chart illustrating a method for managing visual media according to an embodiment.

FIG. 6 is a flow chart illustrating a method for managing visual media according to an embodiment. The method of FIG. 6 uses a device with a controller, an image capture component, a location tracking component, and/or an image application. In other embodiments, the method of FIG. 6 uses additional components and/or devices in addition to and/or in lieu of those noted above and illustrated in FIGS. 1, 2, 3, 4, and 5.

As noted above, the media application is an application which can be utilized independently and/or in conjunction with the controller to manage visual media captured by the device. When managing visual media, the controller and/or the media application poll a location tracking component for location data in response to an image capture component of the device capturing the visual media at 600. The image capture component can be a camera and/or photo sensor which can capture the visual media as one or more images and/or videos.

The location tracking component can be a GPS (global positioning system) receiver and/or radio component which can detect for signals from one or more satellites, base stations, and/or communication towers to identify a current coordinate of the device. In one embodiment, location tracking component can identify the current coordinate by triangulating signals detected from at least three satellites, base stations, and/or communication towers. If the location tracking component can identify the current coordinate, the location data can be available and provided to the controller and/or the media application.

The controller and/or the media application can then store a first location of the device to metadata of the visual media in response to receiving the location data at 610. In one embodiment, storing the first location on the metadata includes storing the current coordinate within the metadata. In another embodiment, storing the first location on the metadata includes identifying an address, city, and/or name of a location corresponding to the current location and storing the address, city, and/or name to the metadata of the visual media.

If the current coordinate cannot be identified by the location tracking component, the location data can be determined to be unavailable. The controller and/or the media application can then proceed to store a second location of the device to the metadata of the visual media if the location data is unavailable at 620. As noted above, the second location is to a backup location or coordinate corresponding to last known location or coordinate of the device. As a result, the second location is a location or a coordinate which was previously identified by the controller and/or the media application as the first location. The method is then complete. In other embodiments, the method of FIG. 6 includes additional steps in addition to and/or in lieu of those depicted in FIG. 6.

Figure 7:
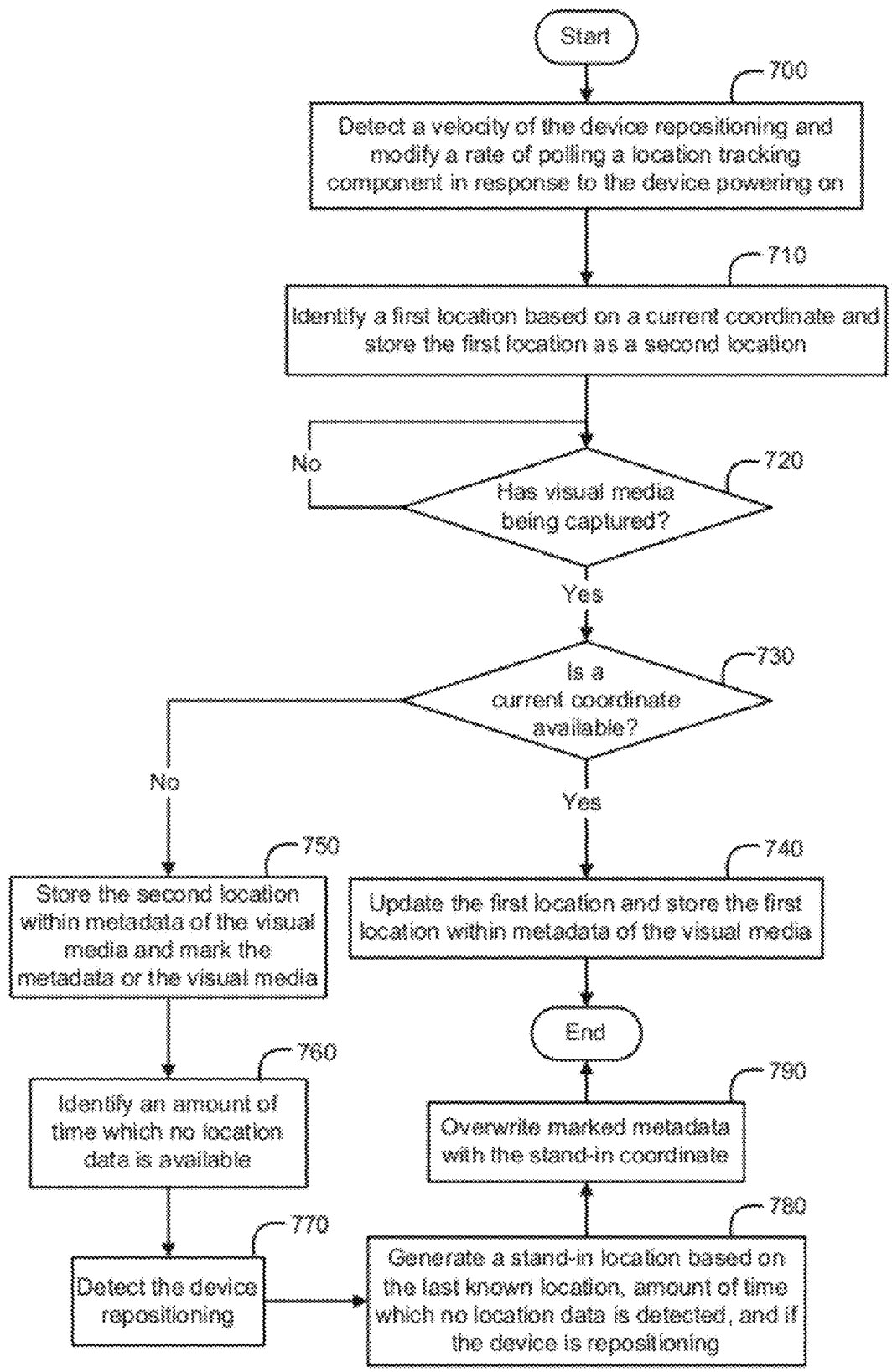
FIG. 7 is a flow chart illustrating a method for managing visual media according to an embodiment.

FIG. 7 is a flow chart illustrating a method for managing an image according to another embodiment. Similar to the method disclosed above, the method of FIG. 7 uses a device with a controller, an image capture component, a location tracking component, and/or an image application. In other embodiments, the method of FIG. 7 uses additional components and/or devices in addition to and/or in lieu of those noted above and illustrated in FIGS. 1, 2, 3, 4, and 5.

In response to the device powering on, the location tracking component can initially detect location data for the device. The controller and/or the media application can continue to poll the location tracking component for the location data at periodic intervals. By continuing to poll for the location data, the controller and/or the media application can determine whether the device is repositioning and identify a velocity or speed of the device repositioning. Based on the velocity or speed of the device repositioning, the controller and/or the media application can modify a rate of polling the location tracking component for the location data at 700.

As the controller and/or the media application receive the location data, the controller and/or the media application can identify a first location of the device based on a current coordinate included in the location data. In response to identifying the first location of the device, the controller and/or the media application can copy the first location of the device and store the copy as the second location of the device at 710. By backing up the first location, a most recent location of the device can be retained within the second location and the first location can continue to be updated each time a new coordinate is detected by the location tracking component. In one embodiment, each time the first location is updated, the second location can additionally be updated with a copy of the first location.

The controller and/or the media application can then determine whether the image capture component has captured visual media 720. The image capture component can capture visual media in response to an instruction from the controller, the media application, and/or from a user of the device. If no visual media is captured, the controller and/or the media application can continue to determine whether visual media has been captured at 720. If an image and/or video have been captured, the controller and/or the media application can proceed to poll the location tracking component for location data to determine whether a current coordinate is available at 730.

If the current coordinate is available, the location tracking component can supply the current coordinate as location data to the controller and/or the media application. The controller and/or the media application can then update the previously identified first location and store the updated first location within metadata of the visual media at 740. As noted above the first location can be stored within metadata as the current coordinate and/or as an address, city, or name of a location associated with the current coordinate. Alternatively, if the current coordinate is not available, the location tracking component can notify the controller and/or the media application that location data is unavailable. In one embodiment, the controller and/or the media application can further identify a time when the location data was initially determined to be unavailable.

The controller and/or the media application can then proceed to access the second location corresponding to the last known location or coordinate of the device. The controller and/or the media application can then store the second location within metadata of the visual media and mark the metadata and/or the visual media at 750. By marking the metadata and/or the visual media, the controller and/or the media application can keep track of which visual media includes the second location.

The controller and/or the media application can then track an amount of time which no location data is available by comparing the previously identified time to the current time at 760. In another embodiment, the amount of time which no location data is available can be based on when the location tracking component redetects signals and/or reestablishes connection to the satellites, base stations, and/or communication towers. The controller and/or the media application can then detect for the device repositioning at 770. In one embodiment, if the device is not repositioning, the controller and/or the media application can unmark any visual media or their corresponding metadata if the corresponding visual media was taken while the device is stationary.

In another embodiment, if the device is repositioning, the controller and/or the media application can generate a stand-in location. The stand-in location corresponds to an estimated location or coordinate of where the device was when capturing the visual media. The controller and/or the media application can generate the stand-in location by interpolating the second location, a time which the visual media was captured, the amount of time which no location data is available, a direction of the device repositioning, and/or an orientation of the device repositioning at 780. The controller and/or the media application can then overwrite the second location stored within metadata of marked visual media at 790. The controller and/or the media application can repeat this for each marked visual media. The method is then complete. In other embodiments, the method of FIG. 7 includes additional steps in addition to and/or in lieu of those depicted in FIG. 7.

What is claimed is:

1. A method for managing visual media comprising:
   determining a velocity of a device;
   polling a location tracking component, at a rate of polling based on the velocity of the device, for location data of the device, the location data including first location information and second location information;
   in response to the device capturing a visual media item, determining whether the first location information corresponds to a current location of the device;
   storing the first location information to metadata of the visual media item in response to a determination that the first location information corresponds to the current location of the device;
   in response to a determination that the first location information does not correspond to the current location of the device:
      storing the second location information to the metadata of the visual media item;
      marking the visual media item to indicate that the metadata includes the second location information; and
      in response to a determination that the device is repositioning after marking the visual media item, overwriting the second location information stored in the metadata with a generated stand-in location.

2. The method of claim 1, wherein polling the location tracking component for the location data includes detecting a current coordinate of the device.

3. The method of claim 2, further comprising identifying a location associated with the current coordinate of the device.

4. The method of claim 1, wherein the first location information is subsequent to the second location information .

5. The method of claim 2, wherein the second location information is a last known location of the device when the coordinate of the device is detected, and wherein the first location information is stored by the device as the second location information if the coordinate of the device is detected.

6. The method of claim 1, further comprising, in response to a determination that the device is not repositioning after marking the visual media item, unmarking the visual media item.

7. The method of claim 1, further comprising identifying an amount of time which no location data is available based on when the location data is initially not available from the location tracking component and when the location data is re-established by the location tracking component.

8. The method of claim 1, wherein determining the velocity of the device comprises using the location data from the location tracking component.

9. The method of claim 1, further comprising generating the generated stand-in location based on at least the second location information, a time when the visual media item is captured, and an amount of time which no location data is available.

10. The method of claim 9, wherein generating the generated stand-in location is further based on a direction and orientation of the device repositioning.

11. A device comprising:
an image capture component;
a location tracking component to detect location data of the device, the location data including first location information and second location information; and
a controller to:
  determine a velocity of the device during repositioning;
  poll the location tracking component, at a rate of polling based on the velocity, for the location data of the device;
  in response to the image capture component capturing a visual media item, determine whether the first location information corresponds to a current location of the device;
  store the first location information to metadata of the visual media item in response to a determination that the first location information corresponds to the current location of the device;
  in response to a determination that the first location information does not correspond to the current location of the device:
    store the second location information to the metadata of the visual media item;
    mark the visual media item to indicate that the metadata includes the second location information; and
    in response to a determination that the device is repositioning after marking the visual media item, overwrite the second location information stored in the metadata with a generated stand-in location.

12. The device of claim 11, wherein the controller is further to generate the generated stand-in location based on at least the second location information, a time when the visual media item is captured, and an amount of time which no location data is available.

13. The device of claim 12, wherein the controller is further to generate the generated stand-in location based on a direction and orientation of the device.

14. The device of claim 11, wherein the controller is further to, in response to a determination that the device is not repositioning after marking the visual media item, unmark the visual media item.

15. A non-transitory computer readable medium storing instructions that, when executed by a controller, cause the controller to:
determine a velocity of a device;
poll a location tracking component, at a rate of polling based on the velocity of the device, for location data of the device, the location data including first location information and second location information;
in response to the device capturing a visual media item, determine whether the first location information corresponds to a current location of the device;
store the first location information within metadata of the visual media item in response to a determination that the first location information corresponds to the current location of the device; and
in response to a determination that the first location information does not correspond to the current location of the device:
  store the second location information to the metadata of the visual media item;
  mark the visual media item to indicate that the metadata includes the second location information; and
  in response to a determination that the device is repositioning after marking the visual media item, overwrite the second location information stored in the metadata with a generated stand-in location.

16. The computer readable medium of claim 15, wherein the instructions cause the controller to further detect the velocity of the device during repositioning, and continually modify the rate of polling the location tracking component for the location data based on the velocity.

17. The computer readable medium of claim 15, wherein the instructions cause the controller to increase the rate of polling if the velocity of the device is detected to increase.

18. The computer readable medium of claim 15, wherein the instructions cause the controller to decrease the rate of polling the location tracking component for the location data if the velocity of the device is detected to decrease.

19. The computer readable medium of claim 15, wherein the instructions cause the controller to generate the generated stand-in location based on the second location information, a time when the visual media item is captured, and an amount of time which no location data is available.

20. The computer readable medium of claim 15, wherein the instructions cause the controller to, in response to a determination that the device is not repositioning after marking the visual media item, unmark the visual media item.

* * * * *